(12) United States Patent
Bouchy et al.

(10) Patent No.: US 7,448,808 B2
(45) Date of Patent: Nov. 11, 2008

(54) ARRANGEMENT OF BEARING SUPPORTS FOR THE ROTATING SHAFT OF AN AIRCRAFT ENGINE AND AN AIRCRAFT ENGINE FITTED WITH SUCH AN ARRANGEMENT

(75) Inventors: Gael Bouchy, La Chapelle Iger (FR); Alain Mazelet, Palaiseau (FR); Daniel Jean-Marie Martin, Bombon (FR); Patrick Charles Georges Morel, Chartrettes (FR)

(73) Assignee: SNECMA, Paris (FR)

( * ) Notice: Subject to any disclaimer, the term of this patent is extended or adjusted under 35 U.S.C. 154(b) by 783 days.

(21) Appl. No.: 10/870,059

(22) Filed: Jun. 18, 2004

(65) Prior Publication Data
US 2005/0129343 A1  Jun. 16, 2005

(30) Foreign Application Priority Data
Jun. 20, 2003 (FR) .................................. 03 50240

(51) Int. Cl.
*F02C 7/06* (2006.01)
*F16C 27/00* (2006.01)

(52) U.S. Cl. .................. 384/495; 384/536; 384/624; 60/39.091; 60/223; 415/9; 416/174; 416/500

(58) Field of Classification Search ............ 384/495, 384/536, 558, 624; 60/39.091, 223; 415/9; 416/174, 500
See application file for complete search history.

(56) References Cited

U.S. PATENT DOCUMENTS

| 5,974,782 | A | 11/1999 | Gerez |
| 6,073,439 | A * | 6/2000 | Beaven et al. .................. 60/223 |
| 6,109,022 | A | 8/2000 | Allen et al. |
| 6,240,719 | B1 * | 6/2001 | Vondrell et al. ............... 60/223 |
| 6,491,497 | B1 * | 12/2002 | Allmon et al. ............... 416/174 |

FOREIGN PATENT DOCUMENTS

| EP | 0 814 236 | 12/1997 |
| EP | 1 008 726 | 6/2000 |
| EP | 1 126 137 | 8/2001 |
| FR | 2 115 316 | 7/1972 |
| WO | WO 03/038241 | * 5/2003 |

* cited by examiner

*Primary Examiner*—William C Joyce
(74) *Attorney, Agent, or Firm*—Oblon, Spivak, McClelland, Maier & Neustadt, P.C.

(57) ABSTRACT

An arrangement of bearing supports for a rotating shaft mounted on bearings connected to an engine stator structure by bearing supports of which at least one is made up of N>1 elements effectively acting in parallel to simultaneously connect the bearing to the structure, of which N−1 of the N elements form this connection by fusible links, is made up of a first bearing supported by a first bearing support and a second bearing supported by a second bearing support, that of the two bearing supports which makes up the N>1 elements being the second bearing support.

11 Claims, 3 Drawing Sheets

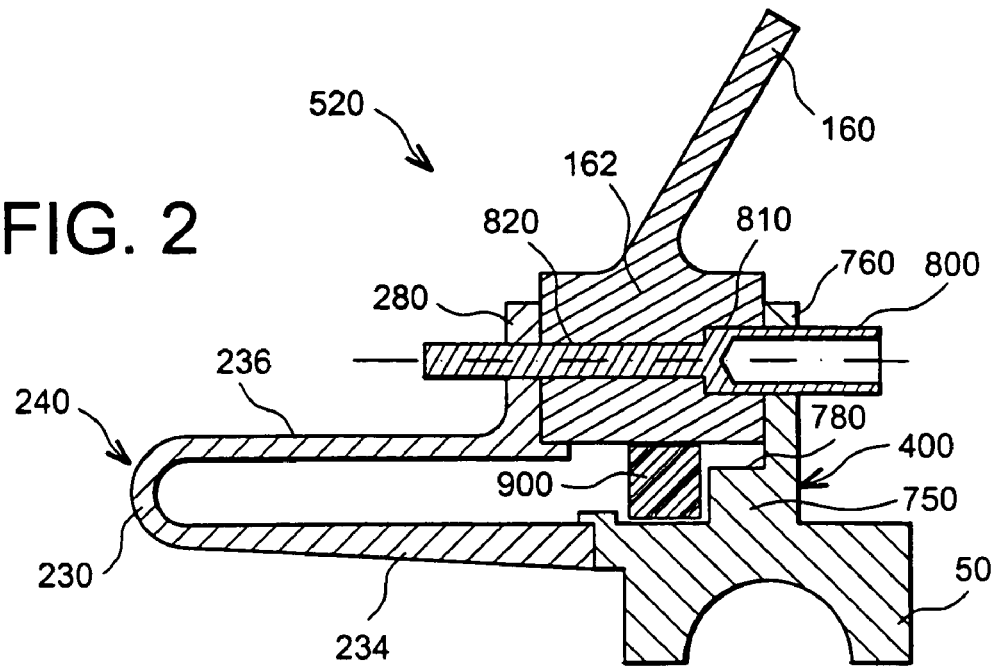
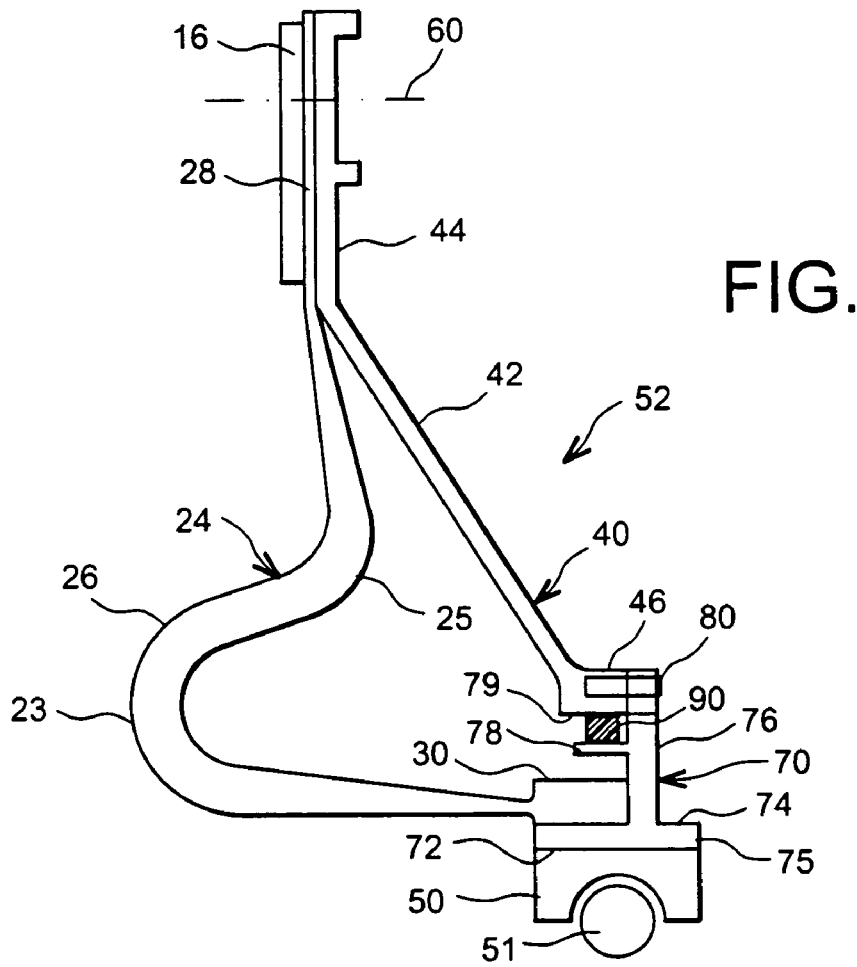

ARRANGEMENT OF BEARING SUPPORTS FOR THE ROTATING SHAFT OF AN AIRCRAFT ENGINE AND AN AIRCRAFT ENGINE FITTED WITH SUCH AN ARRANGEMENT

TECHNICAL FIELD

The present invention relates to the technical field of aircraft engines.

The invention applies more specifically to an arrangement of bearing supports for a rotating shaft of an aircraft engine, capable of compensating for the damaging effects induced by the use of a decoupling system. A decoupling system, when specified for an aircraft engine, is activated for example in the event of significant unbalancing of a rotating shaft caused, by example, by damage to a fan blade following bird strike.

The invention also relates to aircraft engines fitted with such an arrangement of bearing supports for the rotating shaft.

In everything that follows, the terms "proximal" will be used for all elements that are close to the rotating shaft, and "distal" for elements that are remote from the rotating shaft.

THE FORMER STATE OF THE TECHNIQUE

In general terms, an aircraft engine is comprised of a rotating shaft that drives one or more items of equipment in rotation, such as, for example the fan blades making up the engine fan. The shaft is held in place by an engine stator structure using bearings and bearing supports. In the event of bird strike on the engine, the fan blades could break which would result in significant unbalancing. The loads produced by this unbalancing are propagated from the shaft towards the engine structure and could damage the latter to the point where it could prevent the aircraft from being able to continue in flight, and this has led some manufacturers to install decoupling systems. These decouplers are associated with undesirable effects, however, including the following:

- on one hand the rotating shaft moves radially in an uncontrolled manner with a displacement which may be significant large and which is self-perpetuating,
- on the other hand, since the rotating shaft is no longer being held axially, it is carried forwards, which causes considerable damage to the entire structure.

Some documentation on earlier technology describes devices whose aim is to reduce the undesirable effects of such unbalancing.

Document EP 0 814 236, whose contents are included here for reference purposes, describes the operation of an engine which has a rotating shaft mounted on bearings which are connected to the structure through bearing supports. It describes in particular a bearing support equipped with a double force pathway, made up of one force pathway known as the "stiff" force pathway, and a second force pathway referred to as the "flexible" force pathway.

FIG. 4 shows schematically the construction example which is described in a detailed manner in the earlier technical document EP 0 814 236. In this specific method of construction rotating shaft 110, to which fan blades 112 are connected, is guided in rotation by a first bearing 120, also called bearing No.1, and by a second bearing 150, also called bearing No.2, downstream of the first bearing 120. The free ends of fan blades 112 are close to casing 114 surrounding the fan stage. The second bearing 150 is, in the example shown, a roller-bearing connected to the structure 116 of the jet engine through a support on the second bearing 152. The first bearing 120 is, in this example, a ball bearing 121 connected to the aircraft structure by a support of the first bearing 122. The first bearing support 122 is made up of a first component 124 and a second component 140 which have different stiffnesses. The second component 140 (the stiff force pathway) has greater stiffness than the first component 140 (the flexible force pathway).

The first component 124 includes a first flexible tapered surface 126, which extends at its end which is furthest from the first bearing 120 by means of a first distal flange 128, and which extends axially at its other extremity by means of a component 132 which clamps bearing 120, and radially towards the exterior by means of a first proximal flange 130.

The second element 140 has a second flexible tapered surface 142, which extends at its end furthest from the first bearing 120 by means of a second distal flange 144, and which extends at its other end radially towards the interior through a second proximal flange 146. Both distal flanges 128 and 144 are fixed to each other and to the structure 166 by means of bolts 134. Both proximal flanges 130, 146 are fixed to each other by means of connecting elements known as fusible components 136, which are designed to break under shear when subjected to radial forces that are greater than or equal to a predetermined value and where the said fusible elements may be bolts. In FIG. 4, 138 identifies the fusible zone, that is to say, the zone in which the fusible elements operate.

In normal operation of the engine, the rotating shaft is linked to the structure through the combination of the stiff force pathway and the flexible force pathway of the first bearing support, with the forces being mainly transmitted through the stiff force pathway.

If a significant accidental unbalancing occurs, the fusible elements give way. The stiff force pathway then no longer operates. The breaking apart of the fusible components is used to prevent damage to the engine structure by preventing the loads due to unbalancing from being propagated from the shaft to the structure through the stiff pathway of the first bearing support.

Forces are then only transmitted through the flexible force pathway. This configuration means that the engine behaviour can be optimised, that is to say, the vibrations for a given load can be minimised. The engine can therefore operate in a reduced function mode for a period that is sufficient for the aircraft to land.

Moreover, the solution explained in document EP 0 814 236 is compatible with an axial positioning of the bearing held by such a bearing support once the fusible elements have broken apart, that is to say, when the engine is operating in a reduced function mode. The said axial location is obtained through the flexible force pathway. An end-stop effect bearing may be associated with the flexible force pathway, for example a ball-bearing, to maintain the axial positioning of the shaft itself and take up the axial thrust to which the shaft is subjected.

With the bearing support arrangement of the construction model which is described in document EP 0 814 236, however, the radial displacement of rotating shaft 100 increases from the back forwards, as illustrated in FIG. 4 by radial displacements D1 and D2. D1 represents the radial displacement of rotating shaft 110, measured at the axial position of the second bearing 150. D2 represents the radial displacement of rotating shaft 110 measured at the axial position of first bearing 120. With such a mechanical arrangement, D2 is much greater than D1, and a mechanical design for a double chain of forces at the first bearing which would be compatible with displacements as large as this is complicated to implement.

PRESENTATION OF THE INVENTION

The purpose of the present invention is to provide an arrangement of bearing supports for an aircraft engine's rotating shaft which involves a stiff force pathway and a flexible force pathway that are compatible with displacements of the shaft after decoupling, and which is easily implemented.

Form one viewpoint, the invention involves a bearing support arrangement for the rotating shaft of an aircraft engine, with the said rotating shaft being fitted with equipment at its front end and extending to the rear from the equipment, with the said shaft being mounted on bearings connected to an engine stator structure though bearing supports one of which at least includes N>1 elements effectively acting in parallel to simultaneously link the bearing to the said structure, amongst which N−1 of the said N elements provide this link through fusible components. The said arrangement of bearing supports includes a first bearing supported by a first bearing support and a second bearing supported by a second bearing support, with the one support of the two supports which make up the said N>1 elements being the second bearing support.

The second bearing is preferably an axial end-stop effect bearing. In this case the first bearing is not an axial end-stop effect bearing.

The said second bearing support should preferably include two elements that effectively act in parallel and which simultaneously connect the bearing to the said structure, with both of the said elements possessing different stiffnesses and forming a stiff element and a flexible element, with the said stiff element providing the connection between the said second bearing and the said structure through fusible components.

The said stiff element should preferably have an effectively rectilinear profile in longitudinal section.

The said flexible element should preferably have an effectively pin-shaped profile, with one or more curves, in longitudinal section. In one variant, the said pin-shaped profile possesses two curves.

Furthermore, the said bearing support with N>1 elements should preferably include a radial end-stop component to limit radial displacement of the shaft after the fusible components have operated.

Furthermore, the said bearing support with N>1 elements should include damping elements associated with the radial end-stop components after operation of the fusible components.

In one of the most advantageous forms the arrangement of bearing supports that is in accordance with the invention allows the combination of:
- the presence of a double force pathway including a stiff force pathway which can be removed by decoupling in the event of a significant unbalancing, and a flexible force pathway through which the rotating shaft remains attached to the structure,
- the presence of fusible components which carry out the decoupling between the rotating shaft and the engine structure in the stiff force pathway, through a second bearing which incorporates an axial end-stop function, preventing the rotating shaft from being pushed forwards after decoupling between the rotating shaft and the structure in the stiff force pathway,
- radial end-stop components to minimise the amplitude of displacement of the shaft held to the structure by the flexible force pathway after decoupling,
- axial en-stop components to take up the axial forces transmitted by the second bearing after decoupling.

In comparison with the arrangement of bearing supports of earlier designs described above, the arrangement of bearing supports that conforms to the present invention has the advantage of possessing a double force pathway on the second bearing support rather than on the first bearing support, which gives it a lighter and more compact configuration.

From a second viewpoint, the invention is concerned with an aircraft engine fitted with such a bearing support arrangement. The equipment is preferably an engine fan comprised of blades carried on the said rotating shaft.

BRIEF DESCRIPTION OF THE DIAGRAMS

The invention will be more easily understood by reading the following detailed description of a specific construction option of the invention, whilst referring to the appended diagrams, in which:

FIG. 2 shows in longitudinal section a first construction variant of a double force pathway bearing support which is in accordance with the invention;

FIG. 3 shows in longitudinal section a second construction variant of a double force pathway bearing support which is in accordance with the invention;

Figure 4:
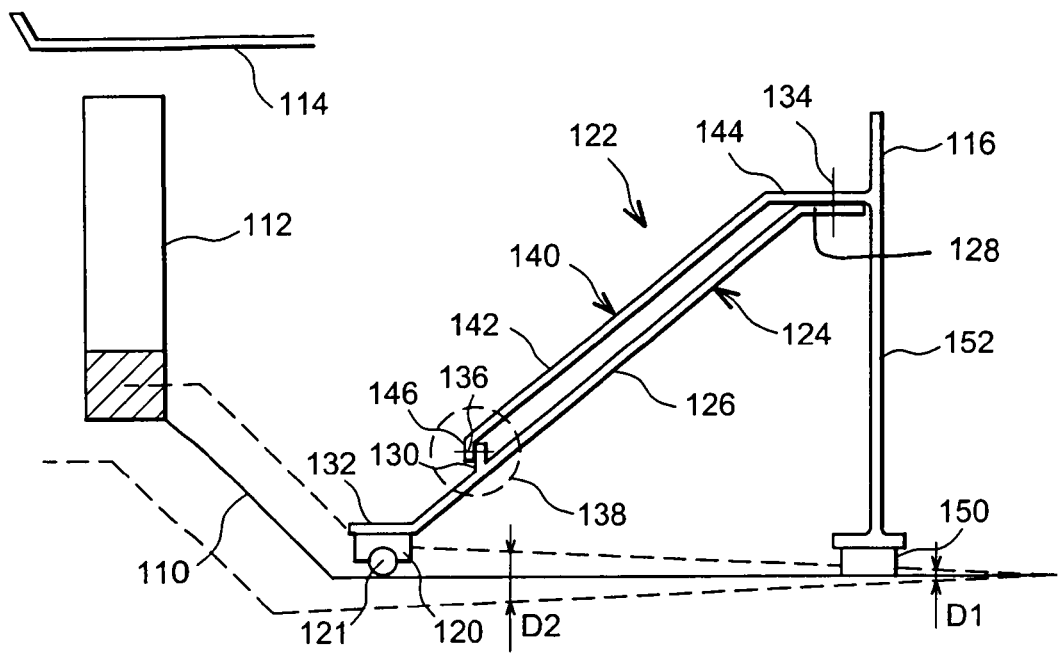
Figure 5:
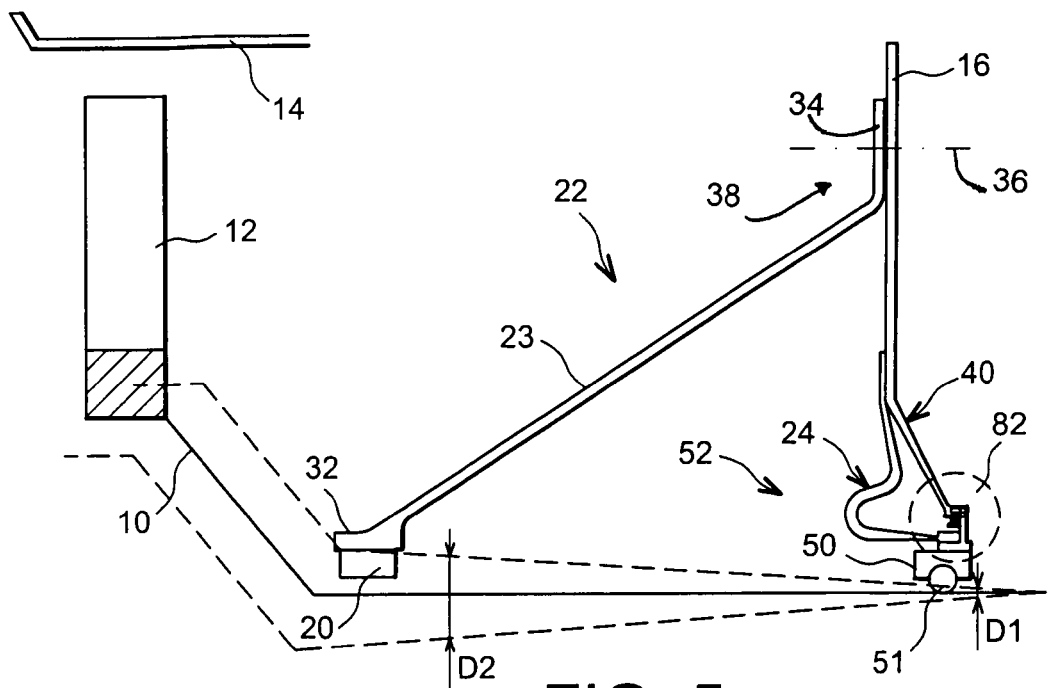

FIG. 4, which has already been described, is the schematic representation in longitudinal section of an earlier design of bearing support arrangement; and FIG. 5 is the schematic representation in longitudinal section of a bearing support arrangement which is in accordance with the invention.

DETAILED DESCRIPTION OF SPECIFIC CONSTRUCTION OPTIONS

Figure 1:
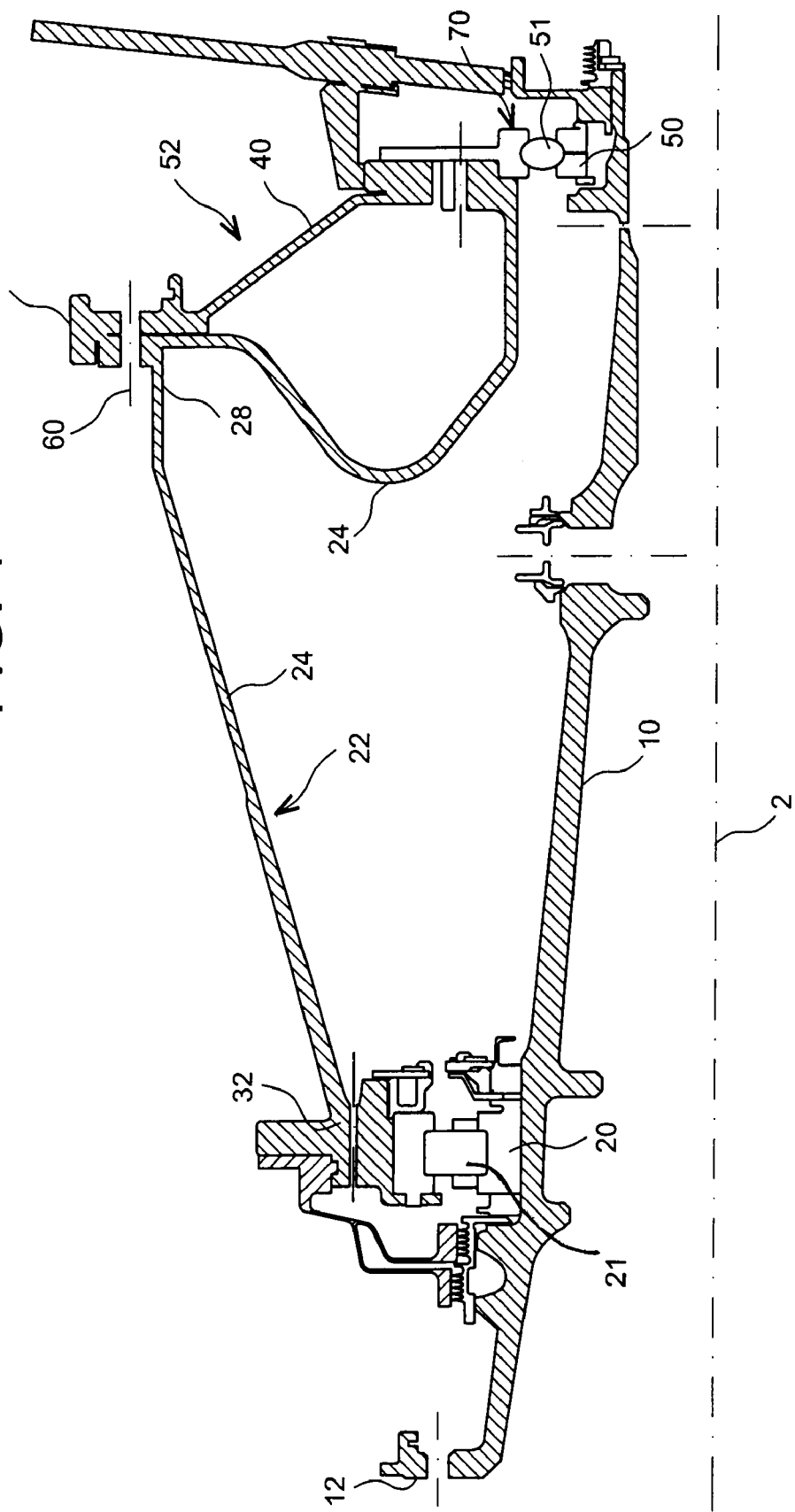
FIG. 1 shows a part of an aircraft engine in longitudinal section, showing a rotating shaft bearing support arrangement which is in accordance with the invention.

With reference first of all to FIGS. 1 and 5, a part of an aircraft engine is shown which includes a shaft 10 rotating around an axis of rotation 2.

At the front of rotating shaft 10 are found items of equipment 12, such as, for example, fan blades, whose free ends are close to a casing 14 surrounding the fan stage.

Rotating shaft 10 is mounted in a first bearing 20 which is a roller-bearing 21, and on a second bearing 50 which is a ball-bearing 51.

The aircraft engine includes a stator structure 16 to which are connected the first bearing 20 and the second bearing 50 through a first bearing support 22 and a second bearing support 52, respectively.

The first bearing support 22 is made up of a turning surface 23 which in longitudinal section has an effectively rectilinear profile. The said surface 23 extends forwards by means of a component 32 surrounding the first surface 20. Towards the rear, the said surface 23 is connected to the structure 16 by means of a standard decoupling system, that is, one which involves only a single force pathway. To that end, surface 23 ends in a flange 34 extending radially towards the exterior. It is fixed to the structure 16 by means of fusible elements 36, with the whole making up a fusible zone 38.

The second bearing support 52 is illustrated in detail in FIGS. 2 and 3, which respectively represent two of its construction variants.

The first construction variant of the second bearing support 52 will be described first, with reference to FIG. 3. The second bearing support 52 includes a first component 24 and a second component 40 which possess different stiffnesses and make up a double force pathway. The second component 40 (the stiff force pathway) has greater stiffness than the first component 24 (the flexible force pathway). The second bearing support 52 also includes a connecting ring 70 made up of a base 75 with an internal face 72 through which it clamps the external ring of the second bearing 50 and an external face opposite the interior face 72, as well as a collar 76 which extends radially toward the exterior.

The first element 24 is made up of a first flexible rotating surface 26 which offers an effectively needle-shaped profile in longitudinal section. This first rotation surface 26 extends at its end which is furthest from the second bearing 50 through a first distal flange 28 which is fixed to the engine structure 16 by any conventional means 60. It extends at its end closest to the second bearing 50 through a first proximal flange 30 which is arranged so that it is effectively parallel to the base 75. The said first proximal flange is wedged, without being fixed, both against external face 74 of base 75 and against the radial collar 76 of connecting ring 70.

The needle-shaped profile of the first rotation surface 26 has, in the first construction variant of the second bearing support 52 (FIG. 3), two curves 23 and 25. The proximal curve 23, which is the curve that is closest to the first proximal flange 30, has its concavity arranged so that is effectively opposite the connecting ring 70, whilst the distal curve 25, which is the curve closest to the first distal flange 28 has its concavity arranged in effectively the opposite manner. The first proximal curve 23 should preferably have a radius of curvature that is less than the radius of curvature of distal curve 25. The radii of curvature and the length of the branches of the needle are selected depending on the desired flexibility properties required for the flexible force pathway.

Curves 23, 25 make up the axial end-stop components allowing the flexible force pathway to take up the axial efforts transmitted by the second bearing, and restrict the axial movement of the rotating shaft towards the front when the fusible components (80, 800, 810) give way, as will be explained below.

Connection ring 70 is, in addition, made up of a projecting part 78 extending from radial collar 76 in an effectively axial direction, that is, parallel with the base 75, from the side by which both components 40, 24 are fixed onto the said connecting ring 70. The function of this projecting part 78 is to create a radial end-stop to restrict the amplitude of radial displacement D1 of the rotating shaft 10 when the fusible components have given way, as will be explained below.

The second element 40 is made up of a second flexible rotation surface 42, which presents an essentially rectilinear profile in longitudinal section. This second rotation surface 42 extends at the end furthest from the second bearing 50 through a second distal flange 44 fixed to the engine structure 16 by any conventional means. It extends at its closest extremity to the second bearing 50 through a second fixed proximal flange 46, by means of the fusible components 80, to the free end of radial collar 76 of connecting ring 70. In the example shown, the second proximal flange is oriented in such a way as to be essentially parallel manner to the base 75. The fusible components 80, which may be bolts, break under the effect of shear forces.

The operation of the arrangement of bearing supports 20, 50, 22, 52 which are in accordance with the invention will now be described, with more specific reference to FIG. 5, which is a schematic representation of the bearing support arrangement 20, 50, 22, 52, 520 which is in accordance with the invention, analogous to the arrangement of bearing supports 120, 150, 122, 152 in the earlier designs already described and schematically represented in FIG. 4.

In normal operation, the second bearing 50 is connected to the engine structure 16 through the combination of two elements 24 and 40, with forces being transmitted mainly through the stiff forces pathway, that is to say, through the second element 40. Under the effect of unbalancing which exceeds a pre-determined limit, fusible devices 36, located in FIG. 5 in the fusible zone of the first bearing support 22, give way. Then fusible components 80 located in fusible zone 82 of the second bearing support give way in their turn. The second bearing 50 is then only connected to structure 16 by the flexible force pathway, that is to say, through the first component 24 whose surface 26 has a profile that is essentially needle-shaped. The stiff force pathway of the second bearing support 52, that is to say, the second element 40, is no longer in operation. Rotating shaft 10 therefore tends to become displaced radially around the stable position that it occupies in normal operation, with a radial displacement D1, D2. In practice, radial displacement values of the order of 30 to 40 mm are encountered for D2 and of the order of 5 mm for D1.

Furthermore, because of the needle shape of its surface 26, the first element 24 is used to axially retain rotating shaft 10, without in any way hampering its radial displacement. The proximal end of this first element 24, in the form of the first proximal flange 30, is given a displacement in an effectively radial direction, with the said movement being limited by the projecting part 78, which acts as a radial end-stop for this first proximal flange 30, against a proximal face 79 of the second proximal flange 46 of the second element 40.

The gap between the said external face 74 and the base 75 and the said projecting part 78 is established depending on the radial end-stop effect required.

As an option, a means of damping 90, represented schematically by a ring forming a damping cushion in FIG. 3, is associated with the projecting part 78 to dampen the end-stop effect. It is fitted between the said protruding part 78 and the second proximal flange 46 of the second element 40.

This explains how this specific arrangement of bearing supports 20, 50, 120, 150 illustrated in FIG. 5 is used to install a double force pathway in a location where the radial displacement of rotating shaft 10 is relatively small, in contrast to the configuration in earlier designs.

The second construction variant of the second bearing support will now be described with reference to FIG. 2. The second bearing support 50 is linked to a component 160 that is solidly fixed to the engine structure 16. It is made up of a first element 240 making up a flexible force pathway and a second element 400, a part of the second bearing 50 or rigidly attached to this, making up a stiff force pathway.

The first element 240 (flexible force pathway) is in a needle-shape, with, in this construction variant, a single curve 230 whose concavity is arranged so that it is effectively opposite the second element 400. The radius of curvature and the length of the branches of the needle are selected according to the desired flexibility properties for the flexible force pathway. The first element 240 is fixed directly to the second bearing 520 by the free end of the proximal branch 234 of the needle. At the free end of the distal branch 236 of the needle it is made up of a distal flange 280 extending in an effectively radial direction.

The second element 400 (stiff forces pathway) is effectively in the form of a flange 760 extending radially towards the exterior from the second bearing 50, the said flange 760 having a base 750 which presents a face 780 oriented towards the exterior and effectively axial.

Fusible components 800, for example, bolts, fix together the solidly fixed components 160 of structure 16, the first component or flexible force pathway 240 and the second element or stiff force pathway 400. More specifically, these fusible components 800 successively cross through radial flange 760 of the second element 400, extremity 162 of component 160, and the distal flange 280 of the first component 240. The fusible components 800 are designed so as to hold a fusible component 810, by which are fixed in place radial flanges 760 and extremity 162 of component 160 and a non-fusible part 820, by which extremity 162 of component 160 and the distal flange 280 are fixed. Fusible components 800 are effectively oriented in an axial direction, and give way, in their fusible part, through shearing under the effect of unbalancing that exceeds a predetermined threshold. As an option, fusible components 800 include in the fusible part 810 a set up intended to calibrate their breaking effect, which in the example shown is in the form of a specific internal tapping 830. In normal operation the assembly made up of the second bearing 50, the second component 400, first component 240 and the extremity 162 of component 160 is maintained rigidly fixed. Under the effect of significant unbalancing the fusible part 810 of the fusible components 800 give way, whilst their non-fusible part 820 does not give way. This then produces a displacement relative to the residual part of the radial flange 760, which corresponds to the part located between the fusible components 800 and the base 750, relative to extremity 162 of component 160 which is a solid part of structure 16. This relative displacement is a radial displacement, guided by the face of extremity 162 in contact with the residual part of radial flange 760, since the remainder of the assembly remains rigidly fixed. The amplitude of this radial displacement is governed by the flexibility of the flexible forces pathway. The amplitude is restricted by the external face 780 of base 750, which fulfils a radial end-stop function by coming into contact with extremity 162 of component 160. The value of this radial play is established according to the radial end-stop effect that is desired. As an option, a damping component 900, represented schematically by a ring forming a damping cushion in FIG. 2, is associated with the base 750 to dampen the end-stop effect. It is fitted between the said base 750 and extremity 162 of component 160.

The first construction variant of the support of the second bearing 52 offers the advantage of being a solution that is easy to put into operation.

The second construction variant of the second bearing support 520 offers, furthermore, the advantage of a compact design giving it a small volume and minimum weight.

The invention is, of course, not restricted to the construction examples that have just been described.

Without exceeding the bounds of the invention, it is possible to use fusible devices other than bolts that are capable of breaking under shear. These fusible components could be, for example, rivets or rods which are fusible under shear or traction, and a component that is capable of being deformed or of breaking through buckling under the action of a force which exceeds a predetermined value.

One could, without exceeding the bounds of the invention, replace the second bearing with another bearing which carries out the axial end-stop function, such as, for example, a tapered bearing instead of a ball bearing.

As an alternative to the fusible components 800 of the second construction variant for the second bearing support 520, fusible fixing components 810 might be envisaged, along with non-fusible methods of fixing 820, which would be distinct from one another.

The invention claimed is:

1. An arrangement of bearing supports for a rotating shaft in an aircraft engine, said rotating shaft having a front portion carrying an equipment and extending in a rear direction from said front portion, said rotating shaft being mounted successively, in said rear direction from said front portion, on a front bearing linked to an engine stator structure by a first of said bearing supports and on a rear bearing linked to said engine stator structure by a second of said bearing supports, wherein the second bearing support comprises N>1 elastic elements which act substantially in parallel to simultaneously form a connection of said rear bearing to said engine stator structure, N−1 of said N elastic elements forming said connection through fusible components, wherein said second bearing support having N>1 elements further comprises radial end-stop components to restrict the radial displacement of the rotating shaft when the fusible components are broken, and wherein said second bearing support having N>1 elements further comprises damping components associated with said radial end-stop components.

2. An arrangement of bearing supports according to claim 1, wherein said rear bearing is an axial end-stop effect bearing.

3. An arrangement of bearing supports according to claim 2, wherein said rear bearing is a ball bearing.

4. An arrangement of bearing supports according to claim 1, wherein said front bearing is a roller bearing.

5. An arrangement of bearing supports according to claim 1, wherein said second bearing support comprises two said elastic elements acting substantially in parallel and simultaneously connecting said rear bearing to said structure, and wherein said two elements have different stiffness and form respectively a stiff element and a flexible element, said stiff element providing said connection between said rear bearing and said structure through said fusible components.

6. An arrangement of bearing supports according to claim 5, wherein the stiff element has an essentially rectilinear longitudinal section.

7. An arrangement of bearing supports according to claim 6, wherein the flexible element has a profile forming successively, from the rear bearing, a proximal curve having its concavity opposite to the rear bearing and a distal curve having its concavity opposite to the concavity of the proximal curve, in longitudinal section.

8. An arrangement of bearing supports according to claim 7, wherein said flexible element comprises axial end-stop components to take up axial forces transmitted by the rear bearing when the fusible components are broken.

9. An arrangement of bearing supports according to claim 5, wherein said flexible element comprises axial end-stop components to take up axial forces transmitted by the rear bearing when the fusible components are broken.

10. An aircraft engine, comprising an arrangement of bearing supports according to claim 1.

11. An arrangement of bearing supports for a rotating shaft in an aircraft engine, said rotating shaft having a front portion carrying an equipment and extending in a rear direction from said front portion, said rotating shaft being mounted successively, in said rear direction from said front portion, on a front bearing linked to an engine stator structure by a first of said bearing supports and on a rear bearing linked to said engine stator structure by a second of said bearing supports, wherein the second bearing support comprises N>1 elastic elements which act substantially in parallel to simultaneously form a connection of said rear bearing to said engine stator structure, N−1 of said N elastic elements forming said connection through fusible components, wherein said second bearing support comprises two said elastic elements acting substantially in parallel and simultaneously connecting said rear bearing to said structure, and wherein said two elements have different stiffness and form respectively a stiff element and a flexible element, said stiff element providing said connection between said rear bearing and said structure through said fusible components, and wherein the flexible element has a profile forming successively, from the rear bearing, a proximal curve having its concavity opposite to the rear bearing and a distal curve having its concavity opposite to the concavity of the proximal curve, in longitudinal section.

\* \* \* \* \*